March 4, 1969 — G. W. MASSEY — 3,430,954
EXERCISE AND GYMNASTIC STAND
Filed March 17, 1967
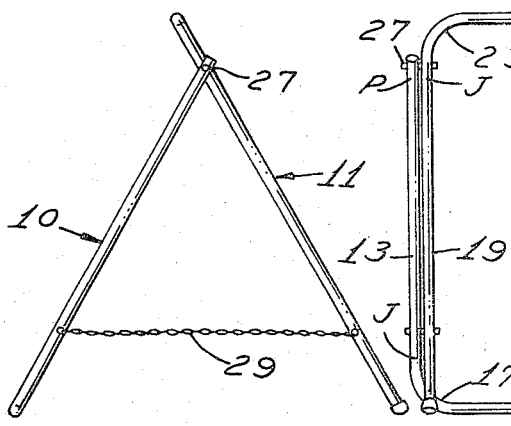
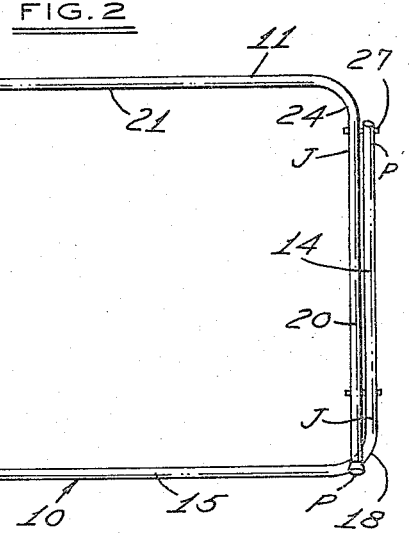
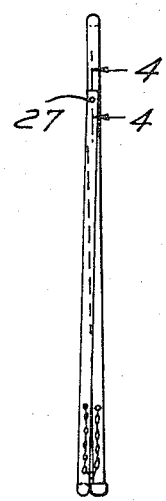
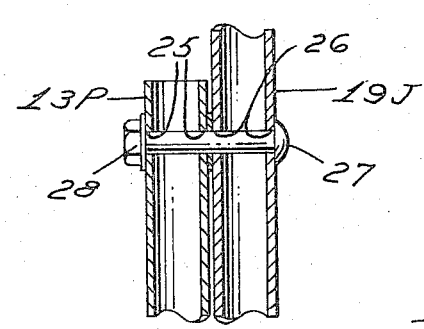
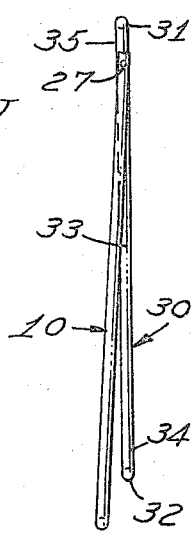
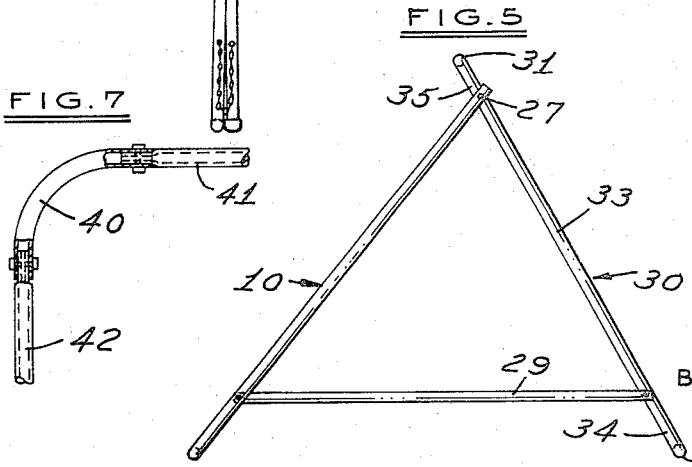
INVENTOR
GRANT W. MASSEY
BY William P. Sevald
ATTORNEY United States Patent Office 3,430,954
Patented Mar. 4, 1969

3,430,954
EXERCISE AND GYMNASTIC STAND
Grant W. Massey, St. Clair Shores, Mich., assignor, by direct and mesne assignments, of two-thirds to James A. Kollar, Birmingham, Mich.
Filed Mar. 17, 1967, Ser. No. 623,906
U.S. Cl. 272—62                                              9 Claims
Int. Cl. A63b 1/00; F16m 11/38

ABSTRACT OF THE DISCLOSURE

Gymnastic stand formed by two U-shaped members being reversely triangularly positioned relative to one another. A joint connects the legs of one U-shaped member to the curved knee portions of the second U-shaped member. A pair of tie linkages inter-connects the curved knee portions of the first U-shaped member to the leg portions of the second U-shaped member to limit movement of the members.

---

This invention relates to stand structure and construction particularly suitable for use in physical exercise and gymnastic stunts and also suitable for many other uses.

While various stands have been employed heretofore, the several devices of the prior art have not proven entirely satisfactory inasmuch as they are complicated in design and construction, expensive to manufacture, and unstable for gymnastic use where varying thrusts and forces are imposed from changing positions and angles.

With the foregoing in view, the primary object of the invention is to provide a stand which is simple in design and construction, inexpensive to manufacture, and extremely stable under changing conditions of load, thrust, and force.

An object of the invention is to provide two like, U-shaped, members each having paired projecting legs and crossbars with the members triangulated and oppositely positioned relative to one another so that the crossbar of one member is positioned upwardly providing interconnecting strength, rigidity, and stability at the top of the stand and the crossbar of the other member is positioned downwardly providing interconnecting strength, rigidity, and stability at the bottom of the stand.

An object of the invention is to connect the ends of the upwardly projecting legs of the member having the downwardly disposed crossbar to the other member at a point on the other member adjacent its upwardly positioned crossbar so that these otherwise projecting legs are cross-tied by the adjacent crossbar of the other member.

An object of the invention is to close the open end of one U-shaped member with the crossbar of the other U-shaped member by connecting the projecting legs of the one member to the other member adjacent the crossbar of the other member to eliminate the instability of projecting legs of one member entirely and to thereby strengthen the stand structural design and to greatly increase the stability of the stand.

An object of the invention is to position the closed end of one U-shaped member downwardly so that its crossbar constitutes a ground engaging interconnecting leg and eliminates one set of projecting legs at the bottom of the stand entirely thereby strengthening the stand structural design and greatly increasing the stability of the stand.

An object of the invention is to provide simple pivot means between the members, such as a pin or bolt, so that the members may be easily folded and unfolded relative to one another.

An object of the invention is to provide tie linkage between the members remote from the pivot point limiting the angular pivoting of the members which tie linkage may be flexible, rigid, removable, or fixed as desired.

An object of the invention is to provide a crossbar of one member in full engagement with a supporting surface at the bottom of the stand to give rigidity and stability to the stand at the bottom.

An object of the invention is to provide a stand having a top crossbar above and beyond the pivotal connection to the other member so that when weight is imposed on the top crossbar urging it downwardly, it automatically thrusts outwardly on the other side of the pivot point urging the stand into its full unfolded condition of maximum stability.

An object of the invention is to provide a stand with two U-shaped members involved having four projecting legs so integrated that only two of the legs remain projecting after assembly.

An object of the invention is to provide a stand embodiment having a rectangular closed loop member and a U-shaped member having the ends of its projecting legs connected to the closed loop member so that the stand has no projecting legs and is very stable and rigid.

An object of the invention is to provide a stand having improved structural design contributing greatly to strength, rigidity, and stability.

An object of the invention is to provide a stand which may be made in various sizes, heights, lengths, and widths, of various size and wall thickness tubular or solid elements; and of various materials of different strengths and weights.

An object of the invention is to provide stands of various heights and commensurate strengths for exercise and gymnasium use such as three to eight feet high, for example, as well as shorter stands for supporting platforms, etc., and also other types suitable for racks.

These and other objects of the invention will become apparent by reference to the following description of the novel stand structure embodying the invention taken in connection with the accompanying drawing, in which:

FIG. 1 is an end elevational view of the stand seen in FIG. 2, showing the device in the unfolded use position and constructed of two U-shaped members.

FIG. 2 is a side elevational view of the stand seen in FIG. 1.

FIG. 3 is an end elevational view of the stand seen in FIGS. 1 and 2 showing the device in the folded storage position.

FIG. 4 is a fragmentary, enlarged, cross sectional view of the pivot means taken on the line 4—4 of FIG. 3.

FIG. 5 is an end elevational view, similar to FIG. 1, showing a modified stand constructed of one closed loop member and one U-shaped member.

FIG. 6 is an end elevational view of the stand of FIG. 5 showing the device in the folded storage position; and FIG. 7 is an enlarged fragmentary showing, partly in cross section, illustrating suitable joining means for making the members other than by one-piece construction.

Referring now to the drawing wherein like numerals refer to like and corresponding parts throughout the several views, the stands disclosed therein to illustrate the invention comprise, FIGS. 1–4, a U-shaped tubular member 10 and a U-shaped tubular member 11 oppositely disposed relative to one another. The member 10 has paired legs 13 and 14, a crossbar 15, and curved knee portions 17 and 18 interconnecting the legs 13 and 14 and the crossbar 15. The member 11 has paired legs 19 and 20, a crossbar 21, and curved knee positions 23 and 24 interconnecting the legs 19 and 20 and the crossbar 21. Each leg 13, 14, 19, and 20 has a projecting end P remote from the knee portions and a joining end J at the knee portions.

The projecting ends P of the legs 13 and 14 have transverse apertures 25. The joining ends J of the legs 19 and 20 also have a transverse apertures 26. A pivot pin such as bolt 27 lies in the apertures 25 and 26 on each side of the stand hingedly connecting the members 10 and 11 together. A nut 28 secures the bolt 27. Paired tie-linkage 29 are connected between the members remote from the pivot point of the bolts 27 to limit the outward hinging movement of the members 10 and 11 relative to one another. The stand is established in the use position by unfolding the members 10 and 11 to the extent of the tielinkage 29 as seen in FIGS. 1 and 2. The stand is collapsed to the storage position by folding the members 10 and 11 together as seen in FIG. 3. While link chain has been shown as suitable linkage in FIG. 1, and a fixed bar is shown as suitable linkage in FIG. 5, it will be understood that any type tie linkage may be used. The pin or bolt 27 may be a joint pin and not a pivot pin in the instance where the stand is set up with rigid tie linkage 29. In this instance the means connecting the rigid linkage are triangulated with the pin or bolt 27.

Referring now to the modified stand of FIGS. 4–6, the member 10 is the same as previously described. The member 30 is a closed loop frame having paired crossbars 31 and 32 interconnected to legs 33 on either side by curved knee portions 34 and 35 at the top and bottom on either side.

While it is preferred to make the members 10, 11 and 30 of one piece construction certain problems of packaging, shipping, and storage in the trade prior to sale are such that some carriers, wholesalers, and retailers require more compact packages that one piece construction permits. FIG. 7 illustrates suitable means for making the members 10, 11, and 30 of severably-connectable construction for compact packaging. Here the curved knee portion 40 telescopes outwardly of the crossbar 41 and the leg 42. The ends of the bar 41 and the leg 42 may be reduced in diameter as shown or the knee portion may be made larger or expanded to fit over, or reversed to fit within, the legs and bar.

The crossbars 15, 21, 31, and 32 may be any length relative to the legs to make the stand as short or as long as desired. Also the legs may be made any length to make the stand as low or high as desired. Aluminum tubing, steel tubing, and steel pipe may be used depending on envisioned use, length of spans, and designed strength. Rods may also be used.

A particularly suitable and demanding use for the stand is physical exercise and gymnastic stunts which requires a very strong and very stable stand structure. Stands three to eight feet high have been found exceedingly satisfactory and have been immediately accepted in the trade as fulfilling a real need. This use is believed exemplary of the extraordinary strength and stability of the stand as the user is constantly imposing thrusts and forces at changing angles and in multiple directions. Under these demanding conditions the user finds the stand as stable as if physically anchored whereas it is only resting on the supporting surface. This unusual, unforeseen strength and stability is initially surprising to a gymnast and later is accepted as a dependable condition.

The almost entire elimination of end-sway at the top by the crossbar 21 of the member 11 and the almost entire elimination of end-sway at the bottom by the crossbar 15 of the member 10 renders the stand very stable. The transverse triangulation is also entirely stable. With the use of the closed loop member 30 the stand is doubly supported against end-sway at the bottom.

While only a simple joint means has been shown and described, it will be understood that more elaborate means may be employed and although but a few embodiments of the invention have been shown and described in detail, it is obvious that many changes may be made in the size, shape, detail, and arrangement of the various elements of the invention within the scope of the appended claims.

I claim:
1. A stand comprising:
   a first U-shaped member having a crossbar having opposite ends, paired spaced legs each having a joining end and a projecting end, and paired curved knee portions connecting said joining ends of said legs to said opposite ends of said crossbar;
   a second U-shaped member having a crossbar having opposite ends, paired spaced legs each having a joining end and a projecting end, and paired curved knee portions connecting and joining ends of said legs to said opposite ends of said crossbar;
   said U-shaped members being reversely triangularly positioned relative to one another with said crossbars of said members oppositely located and with said projecting ends of said legs of said first member lying at said joining ends of said legs on said second member adjacent said curved knee portions of said second member;
   paired joint means connecting said projecting ends of said legs on said first member to said joining ends of said legs on said second member adjacent said curved knee portions of said second member; and
   paired tie linkage interconnecting said legs of said members to each other at points spaced from said joint means to limit movement of said members at said joint means;
   said stand having opposite bottom sides; said crossbar on said first member remote from said joint means constituting a cross-foot for engaging a supporting surface and also constituting the bottom of said stand on one side;
   said projecting ends of said legs on said second member remote from said joint means constituting feet for engaging a supporting surface and also constituting the bottom of said stand on the other side.

2. In a device as set forth in claim 1, curved knee portions connecting with said projecting ends of said legs on said second member, and a crossbar between said knee portions interconnecting them and said legs; said second member thereby being a closed loop frame having a crossfoot for engaging a supporting surface; said stand being crossbar connected at the top and at both bottom sides.

3. In a stand as set forth in claim 1, both said members being of one piece construction and bent at said curved knee portions.

4. In a stand as set forth in claim 1, said curved knee portions being integral with said legs and connecting means joining said curved knee portions and said crossbars.

5. In a stand as set forth in claim 1, said curved knee portions being integral with said crossbars and connecting means joining said curved knee portions and said legs.

6. In a stand as set forth in claim 1, said legs, crossbars, and knee portions being separate and connecting means joining said legs, crossbars, and knee portions together.

7. In a stand as set forth in claim 1, said joint means being a pivot pin and said tie linkage being flexible; said stand thereby being unfoldable to a use position and foldable to a storage position.

8. A tubular gymnastic and exercise stand capable of folding to a flat, collapsed, storage position and unfolding to an expanded, triangulated, stable use position, comprising
   a first U-shaped member having a crossbar having opposite ends, paired spaced legs each having a joining end and a projecting end, and paired curved knee portions connecting said joining ends of said legs to said opposite ends of said crossbar;
   a second U-shaped member having a crossbar having opposite ends, paired spaced legs each having a joining end and a projecting end, and paired curved knee portions connecting said joining ends of said legs to said opposite ends of said crossbar;

said U-shaped members being reversely positioned relative to one another with said legs of said first member located adjacent said legs of said second member and with said crossbars of said members oppositely located;

said projecting ends of said legs of said first member lying at said joining ends of said legs on said second member adjacent said curved knee portions of said second member;

paired pivot means hingedly connecting said projecting ends of said legs on said first member to said joining ends of said legs on said second member adjacent said curved knee portions of said second member; and paired collapsible tie linkage interconnecting said hingedly connected legs of said members to each other at points spaced from said pivot means to limit hinging movement of said members at said pivot means;

said crossbar on said second member adjacent to said pivot means constituting a hand-grab crossbar and also constituting the top of said stand;

said stand having opposite bottom sides; said crossbar on said first member remote from said pivot means constituting a crossfoot for engaging a supporting surface and also constituting the bottom of said stand on one side;

said projecting ends of said legs on said second member remote from said pivot means constituting feet for engaging a supporting surface and also constituting the bottom of said stand on the other side;

said stand being established in the use position by positioning said hand-grab crossbar of said second member upwardly, with said projecting foot ends of said legs of said second member downwardly on a supporting surface, with said foot crossbar of said first member downwardly on a supporting surface, and with said projecting foot ends of said second member and said foot crossbar of said first member spread apart to the limit of said tie linkage by hingedly moving said members on said pivot means in the unfolding direction;

said tie linkage and pivot means stabilizing said stand laterally on a supporting surface by triangulating said members sidewise relative to a supporting surface;

said foot crossbar of said first member stabilizing said stand longitudinally at the bottom on a supporting surface by engaging a supporting surface lengthwise;

said hand-grab crossbar of said second member stabilizing said stand longitudinally at the top lengthwise of said stand;

said stand being established in the storage position by hingedly moving said members at said pivot means in the folding direction.

9. In a device as set forth in claim 8, said second member being a closed loop frame having paired spaced crossbars at the top and bottom and paired spaced legs at the sides.

References Cited

UNITED STATES PATENTS

| | | | |
|---|---|---|---|
| 3,157,136 | 11/1964 | Moody | 108—118 |
| 3,191,554 | 6/1965 | Zierhut | 108—118 |
| 3,223,468 | 12/1965 | Fenne | 248—164 |

ANTON O. OECHSLE, *Primary Examiner.*

RICHARD W. DIAZ, JR., *Assistant Examiner.*

U.S. Cl. X.R.

248—164; 108—118